United States Patent [19]

Teramachi

[11] Patent Number: 4,630,872
[45] Date of Patent: Dec. 23, 1986

[54] LINEAR SLIDE BEARING

[76] Inventor: Hiroshi Teramachi, 2-34-8, Higashi-Tamagawa, Setagaya-Ku, Tokyo, Japan

[21] Appl. No.: 759,472

[22] Filed: Jul. 26, 1985

[30] Foreign Application Priority Data

Sep. 21, 1984 [JP] Japan ................... 59-196535

[51] Int. Cl.$^4$ ........................... F16C 29/06
[52] U.S. Cl. .................................. 384/45
[58] Field of Search .......... 308/6 C, 6 R, 6 A; 464/168

[56] References Cited

U.S. PATENT DOCUMENTS

4,518,206  5/1985  Teramachi .................. 308/6 C
4,527,841  7/1985  Teramachi .................. 308/6 C

Primary Examiner—Lenard A. Footland
Attorney, Agent, or Firm—Kenyon & Kenyon

[57] ABSTRACT

A linear slide bearing includes a pair of bearing case halves which respectively have loaded ball rolling grooves longitudinally formed on their opposing surfaces and ball recirculating bores longitudinally extending therethrough. The respective upper surfaces of the bearing case halves are connected by a top plate which is elastically deformable between the bearing case halves.

5 Claims, 12 Drawing Figures

LINEAR SLIDE BEARING

BACKGROUND OF THE INVENTION

1. Field of the Invention

The present invention relates to a linear slide bearing employed to linearly guide a movable member which is to be slid, for example, in the sliding part of a machine tool such as an NC machine, or an industrial robot. More particularly, the invention pertains to a linear slide bearing which is arranged such as to allow a bearing case which constitutes the bearing to be easily mounted on a movable member as well as to facilitate the adjustment of the clearance between the bearing case and the associated track rail.

2. Description of the Prior Art

A conventional linear slide bearing of the type described above generally includes, as shown in FIG. 12, a bearing case b with a substantially C-shaped cross-section and having a recess a formed on its lower side, a track rail c having its upper portion fitted in the recess a of the bearing case b with a predetermined clearance therebetween, and a multiplicity of balls d recirculating through ball rolling endless tracks which are formed in the bearing case b. The bearing is arranged such as to guide a linear reciprocative motion along the track rail c while bearing loads which may be applied to the bearing case b in the vertical and horizontal directions by means of the balls d.

It is necessary for an appropriate clearance to be selected for such a linear slide bearing between the bearing case b and the track rail c in accordance with the application of the bearing when the following requirements are involved: viz., when high rigidity is required in order to cope with an impact load which may be applied to the bearing by means of inertia moment at the time when the bearing changes its course or passes an overhang; when the bearing is required to have high accuracy in terms of its positioning operation or repeating motion; or when it is necessary for the bearing to move lightly as in the case of its application to a measuring machine in which a light load is generally applied to the bearing and high accuracy is required.

Figure 12:
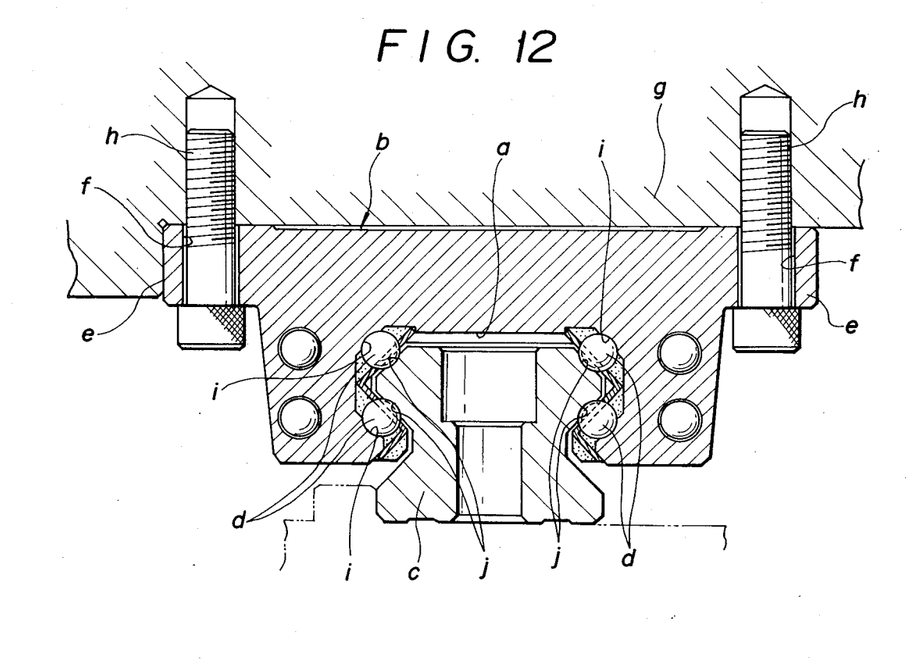
FIG. 12 is a sectional view of a conventional linear slide bearing.

To meet the above-described requirements, it is general practice to vary the aforementioned clearance by adjusting the preload which is applied to the bearing in such a manner that the clearance between loaded ball rolling grooves i formed on the bearing case b and the corresponding ball rolling grooves j formed on the track rail c is made smaller than the diameter of the balls d. In the conventional linear slide bearings of the above-described type, the preload is adjusted by the following method. Namely, as shown in FIG. 12, mounting flanges e are provided at both sides of the upper portion of the bearing case b, and the bearing case b is mounted on a movable member g by employing mounting bolts h which are respectively received through bolt receiving bores f formed in the flanges e and screwed to the movable member g. Then, the clearance between the bearing case b and the track rail c is adjusted by selecting balls d which have a diameter appropriate for given requirements, or by properly selecting the cutting amount of the ball rolling grooves j on the track rail c.

This type of conventional linear slide bearing suffers, however, from the following problems. Namely, to effect the preload adjustment, it is necessary to select balls with an appropriate diameter and fit the selected balls into the endless tracks, or to cut the ball rolling grooves. Accordingly, it is troublesome to assemble the bearing together with a given movable member. Moreover, since the flange surface which engages with the head of the associated mounting bolt h is located above the center of load, if load is applied to the bearing upwardly or downwardly during the use of the bearing, an undesirable clearance is easily produced between the track rail c and the balls d, which fact may disadvantageously cause the bearing case b to chatter or generate noises. Further, since the bearing case b has the outward flanges e integrally formed on its upper portion, the amount of material required is unfavorably increased to a corresponding extent. In addition, when a horizontal load acts on the movable member g, the point of action of the load is undesirably high, which fact disadvantageously involves an increase in the magnitude of the load acting on the respective ball rolling surfaces of the bearing case b and the track rail c of the bearing.

SUMMARY OF THE INVENTION

Accordingly, it is a primary object of the present invention to provide a linear slide bearing which eliminates the above-described disadvantages of the prior art.

To this end, the present invention provides a linear slide bearing comprising: a pair of bearing case halves respectively having loaded ball rolling grooves longitudinally formed on their opposing surfaces and ball recirculating bores longitudinally extending therethrough; a top plate which connects together the respective upper surfaces of the bearing case halves and is elastically deformable between the bearing case halves; a track rail having its upper portion fitted in the space defined between the bearing case halves with a predetermined clearance therebetween, the track rail having ball rolling grooves formed on the two side surfaces thereof which respectively face the above-described opposing surfaces of the bearing case halves, the ball rolling grooves extending longitudinally of the track rail in such a manner as to oppose the corresponding loaded ball rolling grooves, thereby constituting respective loaded ball regions; two pairs of end plates which are respectively secured to both longitudinal ends of the bearing case halves, the end plates respectively having guide grooves formed on the surfaces thereof where the end plates are secured to the corresponding ends of the bearing case halves in such a manner as to provide communication between the corresponding loaded ball rolling grooves and ball recirculating bores, thereby constituting respective endless tracks; and a multiplicity of balls recirculating through the endless tracks and adapted to bear a load in the loaded regions between the bearing case halves and the track rail.

By virtue of the above-described arrangement, the following advantages are offered. Namely, when the bearing case halves are mounted on a movable member which moves along the track rail, the bearing case halves are first tentatively mounted on the movable member by employing mounting bolts. Then, a preload adjustment is effected by employing an adjusting bolt in such a manner that the top plate is elastically deformed, whereby the clearance between the bearing case halves and the track rail is adjusted as desired and a predetermined preload is applied to the balls at the same time. Moreover, since the bearing case halves are mounted on the movable member by making use of the rigidity of the latter, the top plate per se is not required to possess very high strengt.h and can be reduced in its thickness. Further, reduction in the thickness of the top plate permits the height of the bearing to be decreased as a whole. Accordingly, it is possible to locate the center of gravity of the movable member at a favorably low position and hence improve the stability of the movable member.

The above and other objects, features and advantages of the present invention will become clear from the following description of the preferred embodiments thereof, taken in conjunction with the accompanying drawings.

DESCRIPTION OF THE PREFERRED EMBODIMENTS

Preferred embodiments of the present invention will be described hereinunder in detail with reference to the accompanying drawings.

Figure 1:
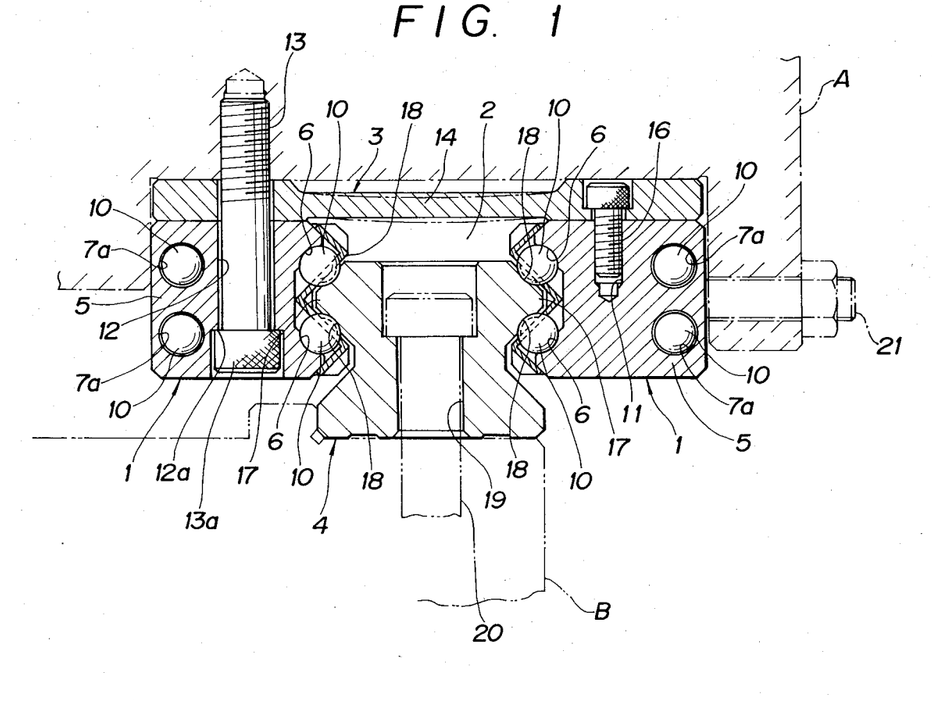
FIG. 1 is a sectional view of a first embodiment of the linear slide bearing according to the present invention.
Figure 2:
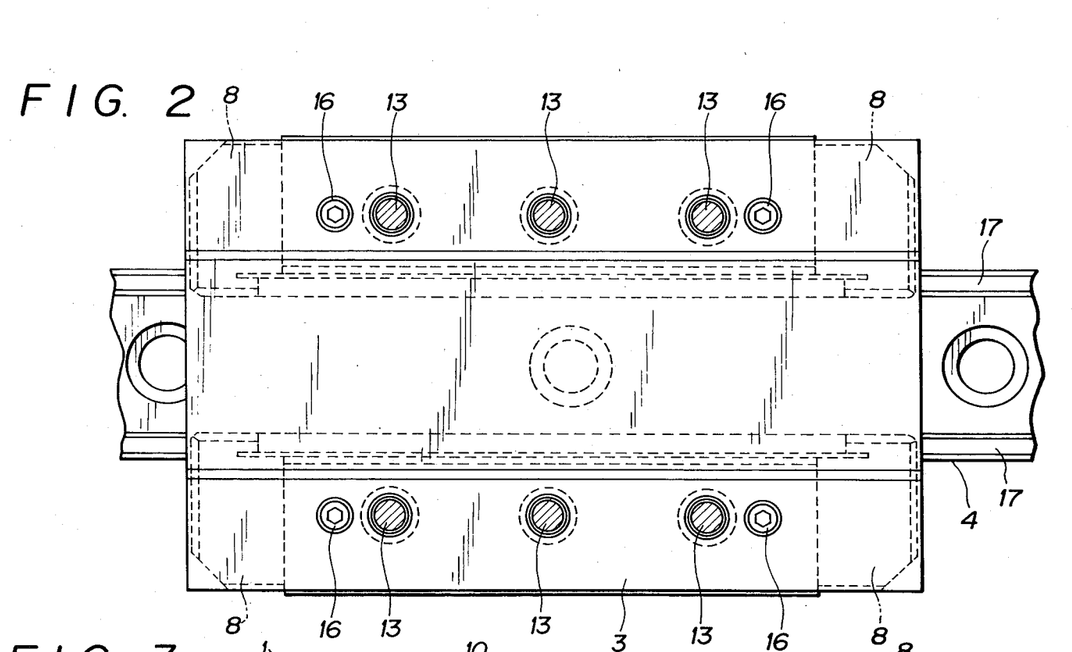
FIG. 2 is a plan view of the embodiment shown in FIG. 1.
Figure 3:
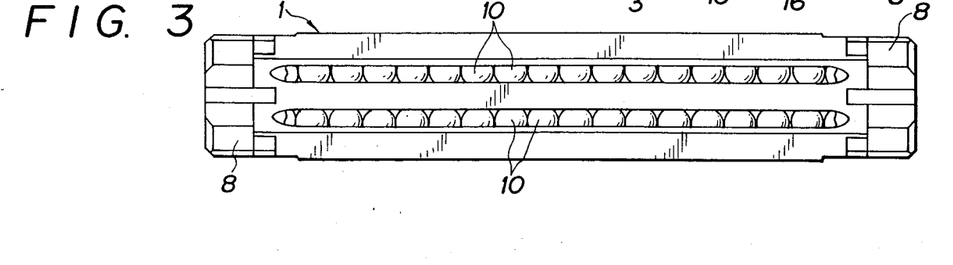
FIG. 3 is a front elevational view of one half of a bearing case employed in the invention.
Figure 4:
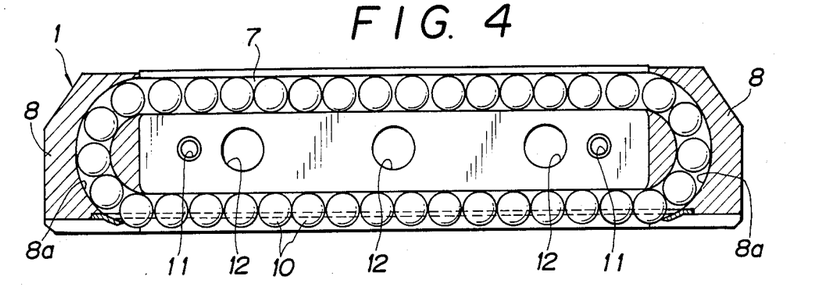
FIG. 4 is a horizontal sectional view of the half of the bearing case shown in FIG. 3.
Figure 5:
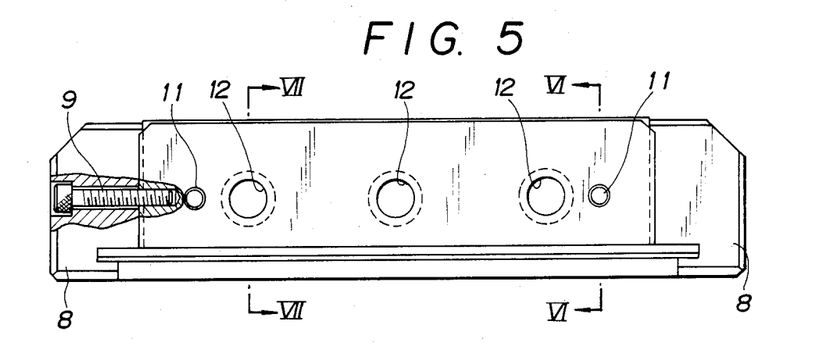
FIG. 5 is a bottom view of the half of the bearing case shown in FIG. 3.
Figure 6:
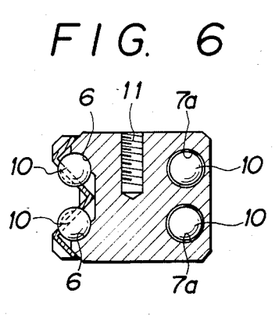
FIG. 6 is a sectional view taken along the line VI—VI of FIG. 5.
Figure 7:
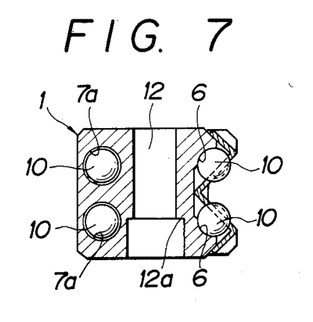
FIG. 7 is a sectional view taken along the line VII—VII of FIG. 5.

FIG. 1 is a sectional view of a first embodiment of the linear slide bearing according to the invention, while FIG. 2 is a plan view of the embodiment.

The linear slide bearing of the invention consists essentially of a pair of bearing case halves 1, a top plate 3 which connects together the respective upper portions of the bearing case halves 1 in such a manner as to define a downward recess 2 and which is elastically deformable between the bearing case halves 1, and a track rail 4 which has its upper portion fitted into the recess 2 with a predetermined clearance therebetween.

Each of the bearing case halves 1 has a base 5 with a substantially rectangular cross-section, as shown in FIGS. 1 and 3 to 7. Each of the bases 5 has two loaded ball rolling grooves 6 formed on the inner surface thereof which opposes that of the other base 5, the loaded ball rolling grooves 6 extending longitudinally of the base 5 and having a substantially semicircular cross-section. Each base 5 is further formed with ball recirculating bores 7a which respectively correspond to the loaded ball rolling grooves 6 and constitute respective ball recirculating tracks 7. A pair of plastic end plates 8 are secured to both longitudinal ends of each of the bearing case halves 1 by employing fixing bolts 9, each end plate 8 having guide grooves 8a which respectively connect each end of one loaded ball rolling groove 6 and the corresponding ball recirculating bore 7a, thereby forming an endless track. Further, a multiplicity of balls 10 are disposed in each of the endless tracks. The balls 10 recirculate through the endless tracks and bear a load when rolling in the area between the loaded ball rolling grooves 6 on each of the bearing case halves 1 and the corresponding ball rolling grooves 17 (described later) which are formed on the track rail 4. Moreover, each of the bearing case halves 1 is formed with a plurality (two in the illustrated embodiment) of threaded holes 11 which are employed when mounting the top plate 3 and a plurality (three in the illustrated embodiment) of bolt receiving bores 12 used in mounting the bearing case half 1 on a movable member A such as a slide table. In this case, the bolt receiving bores 12 are located between the loaded ball rolling grooves 6 and the ball recirculating bores 7a, and each bolt receiving bore 12 has an abutment 12a which engages with the head 13a of a mounting bolt 13, the abutting step 12a being formed at a position in the bolt receiving bore 12 which is below the center of load when the bearing is mounted on the movable member A.

Figure 8:
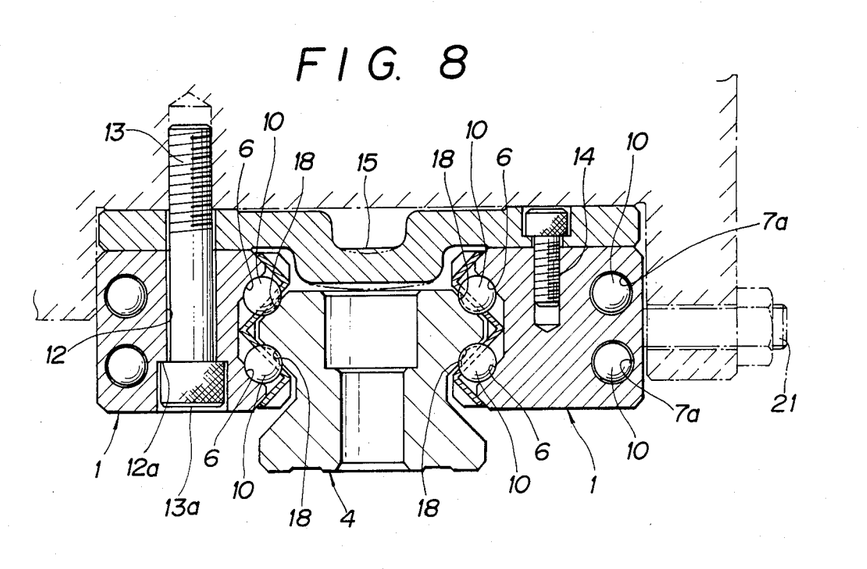
FIG. 8 is a sectional view of a second embodiment of the linear slide bearing according to the present invention.

On the other hand, the top plate 3 is, for example, formed from steel plate and has a thin-walled portion 14 formed at its substantially central portion so that the top plate 3 is elastically deformable at the thin-walled portion 14. However, it is not always necessary for the central portion of the top plate 3 to be reduced in thickness. The central portion of the top plate 3 may be, for example, bent as shown in FIG. 8 such as to provide a bent portion 15 where the top plate 3 is elastically deformable. Further, the top plate 3 is secured to the bearing case halves 1 by employing fixing screws 16 in such a manner that the top plate 3 covers the whole of the upper surface of each of the bearing case halves 1 and the end plates 8 and projects slightly beyond the end plates 8 in the longitudinal direction of the bearing (see FIG. 2). The reason why both ends of the top plate 3 project beyond the corresponding end plates 8 is that it is necessary to protect the end plates 8 from possible collision thereof against a fixed member or portion of a machine or apparatus in which the bearing of the invention is employed at the extremities of the reciprocative motion of the bearing in operation.

Figure 9:
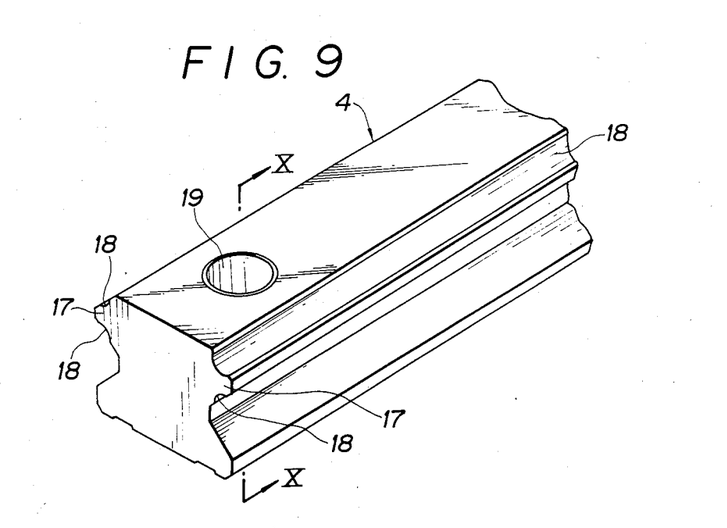
FIG. 9 is a perspective view of a track rail employed in the present invention.
Figures 10, 11:
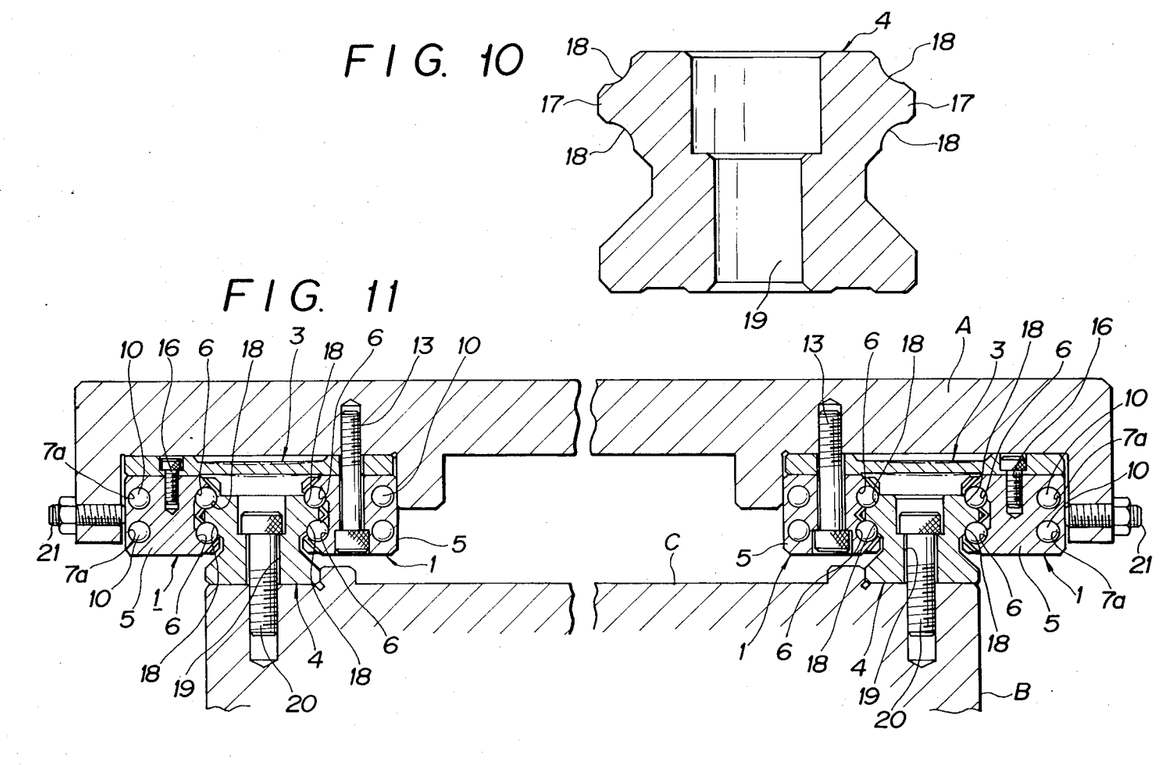
FIG. 10 is a sectional view taken along the line X—X of FIG. 9.
FIG. 11 is a sectional view of a pair of linear slide bearings according to the present invention, which shows the way in which the bearings are used.

The track rail 4 has, as shown in FIGS. 1, 9 and 10, projections 17 formed on both sides of its upper portion, the projections 17 having a substantially trapezoidal cross-section. Each of the projections 17 has on both its side surfaces ball rolling grooves 18 which have a substantially circular cross-section and oppose the corresponding loaded ball rolling grooves 6 in such a manner as to constitute respective loaded ball regions.

It is to be noted that the track rail 4 has a plurality of bolt receiving bores 19 formed in its lateral center and at proper distances in the longitudinal direction of the track rail 4, the bores 19 respectively receiving fixing bolts 20 when the track rail 4 is secured to a bed B of a machine or apparatus by the fixing bolts 20.

It is to be noted also that, although in the above-described embodiment the bearing case halves 1 and the top plate 3 are connected by fixing screws 16, it is not always necessary to employ the fixing screws 16 and they may be connected by employing other fixing means, for example, welding.

The linear slide bearing of the invention, arranged as above, may be incorporated in a slide table which guides a linear reciprocative motion of various kinds of machine or tool. For example, as shown in FIG. 11, two track rails 4 are secured by the fixing bolts 20 to the mounting reference surface C of the bed B which is mounted on a machine or tool. A rigid movable member A is placed between the respective upper sides of the bearings, that is, on the bearing case halves 1 and the top plate 3 which constitute in combination each of the bearings and slide along the corresponding track rail 4. The movable member A and the bearings are then fixed to each other by employing the mounting bolts 13. At this time, in order to apply a predetermined preload to each of the bearings, one of the bearing case halves 1 is pressed toward the track rail 4 by employing an adjusting bolt 21 which is screwed thereinto from the outer side of the movable member A. Thereupon, the top plate 3 of each bearing is elastically deformed between the bearing case halves 1. Thus, it is possible by virtue of this elastic deformation to adjust the clearance between the bearing case halves 1 and the track rail 4 in accordance with the purposes for which the assembly is used. Further, since the abuting step 12a of each of the bolt receiving bores 12 which engages with the head 13a of the associated mounting bolt 13 is located below the center of load, even if load acts on the movable member A in the upward or downward direction, there is no fear of any undesirable clearance occurring between the bearing case halves 1 and the track rail 4. Thus, it is possible to achieve the primary object of the invention.

As has been described above, the linear slide bearing of the invention is composed of a pair of bearing case halves having a multiplicity of balls, and a top plate which connects together the respective upper surfaces of the bearing case halves in such a manner as to define a recess into which the upper portion of a track rail is fitted with a predetermined clearance therebetween, the top plate being elastically deformable between the bearing case halves. Accordingly, mounting of the bearing on a movable member is facilitated. Further, it is possible to adjust the preload in accordance with the application of the bearing, and it is also possible for the preload to be easily readjusted to a desired degree. Moreover, since it is possible to mount the bearing case halves by making use of the rigidity of the movable member, the top plate can be reduced in its thickness. In consequence, when load acts on the movable member in the horizontal direction, the point of application of load is located at a favorably low position, so that it is possible to improve the stability of the movable member. Further, it is advantageously possible to reduce the distance between the point of contact of each of the loaded balls and the point of action of external force, since the bolts which are employed to mount each of the bearing case halves on the movable member are located between the loaded ball rolling grooves and the ball recirculating bores of the bearing case half and since the abutment of each of the bolt receiving bores which engages with the head of the associated mounting bolt is located below the center of load. For this reason, even if external force is applied to the movable member in operation, there is no risk of any undesirable clearance occurring between the bearing case halves and the track rail, and it is possible for the bearing to effect a stable linear reciprocative motion. Thus, the invention is of great value in practical use.

Although the invention has been described through specific terms, it is to be noted here that the described embodiments are not exclusive and various changes and modifications may be imparted thereto without departing from the scope of the invention which is limited solely by the appended claims.

What is claimed is:

1. A linear bearing unit comprising:
   a pair of bearing case halves disposed in spaced parallel relation with each other and having opposed surfaces facing one another thereby defining a space therebetween, each of the bearing case halves having loaded ball rolling grooves longitudinally formed on their opposed surfaces and ball-recirculating bores longitudinally formed therethrough;
   a top plate of less rigidity than said bearing case halves separately formed from the bearing case halves and secured by fastening means to the upper surfaces of the bearing case halves so as to provide an assembled formation of a channellike cross section, the top plate being adapted to be elastically deformable between the bearing case halves;
   a track rail disposed in the space defined between the bearing case halves with predetermined clearances formed therebetween, the track rail being provided on the opposite side surfaces thereof with loaded-ball rolling grooves which are disposed in face-to-face relation with corresponding loaded-ball rolling grooves on the bearing case halves so as to form respective loaded-ball rolling regions;
   two pairs of end plates which are respectively secured to the opposite longitudinal ends of each of the bearing case halves, each of the end plates being provided, on the inner surface thereof which abuts the corresponding end of one of the bearing case halves, with ball-guide grooves which respectively interconnect each loaded-ball rolling region and the corresponding one of the ball-recirculating bores so as to form respective endless ball-recirculating passages;
   a multiplicity of balls disposed in and adapted for recirculating through the endless ball-recirculating passages for bearing a load applied to the bearing unit in the loaded-ball rolling regions formed between the bearing case halves and the track rail; and
   means for causing the top plate to elastically deform for adjusting the clearances between the bearing case halves and the track rail and preloading the balls in the loaded-ball rolling regions.

2. A linear bearing unit according to claim 1, wherein the top plate is provided at its center between the bearing case halves with a thin-walled portion which is elastically deformable.

3. A linear bearing unit according to claim 1, wherein the top plate is provided at its center between the bearing case halves with a bent portion which is elastically deformable.

4. A linear bearing unit according to claim 1, wherein the top plate covers both the upper surfaces of the bearing case halves and the end plates, and projects slightly beyond each of the end plates in the longitudinal direction of the bearing unit.

5. A linear bearing unit according to claim 1, wherein each of the bearing case halves has through bores formed therein at locations between the loaded-ball rolling grooves and the ball-recirculating bores, the through bores being adapted to receive headed mounting bolts by which the bearing case halves are mounted on a movable member, each of the through bores having a large-diameter portion and a small-diameter portion with an abutment surface defined therebetween for abuttingly engaging the head of the related one of the mounting bolts received therein, the abutment surface being positioned at a loaction below the center of the load applied to the bearing unit.

* * * * *